E. P. TAYLOR.
ELECTRIC TOASTER.
APPLICATION FILED FEB. 20, 1919.
1,331,829.
Patented Feb. 24, 1920.
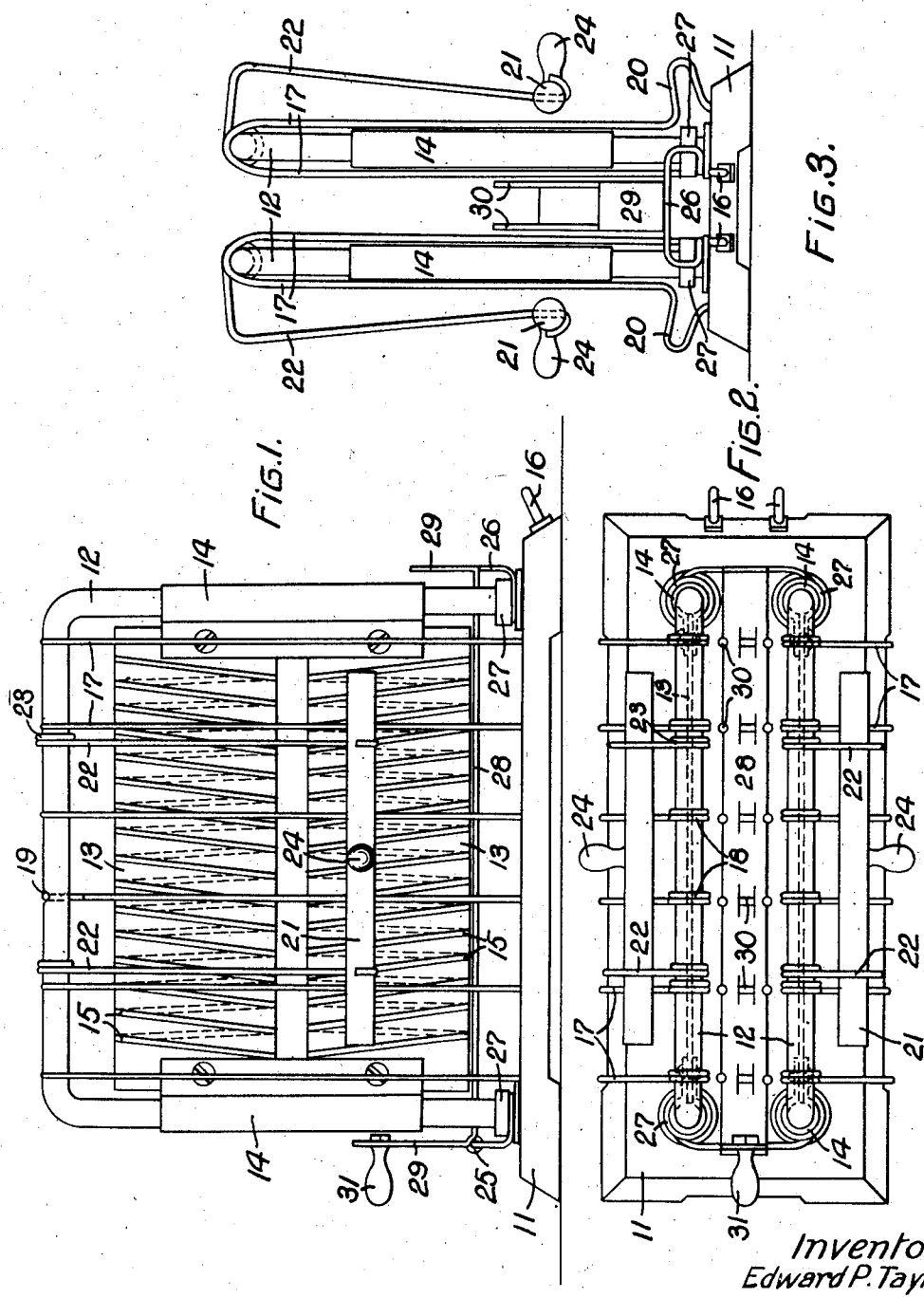
Inventor
Edward P. Taylor
By Featherstonhaugh & Co.
Attys.

UNITED STATES PATENT OFFICE.

EDWARD P. TAYLOR, OF OTTAWA, ONTARIO, CANADA.

ELECTRIC TOASTER.

1,331,829.   Specification of Letters Patent.   Patented Feb. 24, 1920.

Application filed February 20, 1919. Serial No. 278,165.

*To all whom it may concern:*

Be it known that I, EDWARD P. TAYLOR, a subject of the King of Great Britain, and resident of the city of Ottawa, in the Province of Ontario and Dominion of Canada, have invented certain new and useful Improvements in Electric Toasters, of which the following is a full, clear, and exact description.

This invention relates to improvements in electric toasters, and the object of the invention is to provide a device adapted to toast two slices of bread simultaneously on one side and an additional third slice on both sides at once.

The majority of toasters in use will toast only one side of the bread at a time, so that there are frequently considerable periods of waiting for both sides of the bread to be toasted. If two heating elements are used and the bread placed between them the toasting will be accomplished very rapidly, but only one slice at a time will be made unless the elements are very large so that there are still considerable periods of waiting between slices.

According to this invention a device is provided which will toast both sides of the bread simultaneously and at the same time will toast other slices one side at a time, so that both rapidity and quickness of production may be obtained.

The device consists briefly of a base carrying terminals and a pair of spaced upright frames which support the heating elements. A bread holder is provided between the elements and in addition bread holders are provided on the remote or outside sides of the elements.

In the drawings which illustrate the invention;—

Figure 1 is a side elevation of the toaster.
Fig. 2 is a plan view of same.
Fig. 3 is an end elevation.

Referring more particularly to the drawings, 11 designates a base of any suitable structure to which a pair of inverted U-shaped frames 12 are connected in spaced relation. A pair of mica plates 13 are mounted one above the other in each frame by means of clips 14 surrounding the frames 12 and embracing the ends of the plates. These plates 13 form the carriers for the heating element 15 which is disposed and connected to the terminals 16 in the well known manner. A series of inverted U-shaped guard wires 17 are arranged in planes perpendicular to the planes of the frames 12. These guard wires embrace the frames 12 and their ends are secured in any suitable manner to the base. If desired the connected wires may be looped around the tops of the frames as clearly shown at 18 in Fig. 2, or may be without loops and seated in notches 19 as shown in Fig. 1. The arms of the guard wires between the frames 12 go straight down to the base but the arms of the guard wires on the remote or outer sides of the frames are bent outwardly and then inwardly a short distance above the base to provide rests 20 for slices of bread. The wires 17 form guards to hold the bread out of contact with the heating element. In order to hold the bread against the connected wires and in proper toasting position transverse bars 21 are suspended from the tops of the racks by wires 22 which are looped loosely around the tops of the frames as shown at 23, Fig. 1, and are then directed away from the frames for a short distance before descending to the bars 21. Each bar 21 may thus be raised a sufficient distance to permit the insertion or removal of bread. For convenience the bars 21 are each provided with a handle 24 of any suitable material of low thermal conductivity.

At each end of the toaster a pair of transverse wires 25 and 26 are provided between the ends of the frames 12. These wires are conveniently secured by looping their ends around the frames so that they will be clamped between collars or other projections 27 on the frames and the base 11. A long narrow plate 28 is located in a horizontal plane between the frames and is upturned at its ends as shown at 29. At one end this plate is hingedly connected in any suitable way with the cross-wire 25. A series of short U-shaped wires 30 are connected to the plate 28 at suitable intervals. These wires project upwardly a suitable distance from the plate and form with the up-turned plate ends a support for a slice of bread. The up-turned end portion 29, at the hinged end of the plate is provided with a handle 31 of any suitable material of low thermal conductivity. It will be seen that by depressing the handle 31 the plate 28 may be swung upwardly between the frames 12 so as to expose a slice of bread carried by the plate.

The toaster is operated in the usual manner. Slices of bread are placed on the supporting portions 20 of the rack wires 17 and held in proper position by the bars 21. When the sides of the bread next the heating element are toasted, the bars 21 are raised and the slices turned. At the same time that bread is toasting on the outside of the device, a single slice may be placed on the plate 28 between the heating elements so that both sides of this slice will be toasted simultaneously. Obviously a single slice of bread may be toasted between the frames without outside slices being simultaneously toasted. When it is desired to inspect a slice of bread toasting on the plate 28, the handle 31 is depressed and the plate 28 oscillates to expose a part of the slice which may be examined or grasped to remove the toast.

Having thus described my invention, what I claim is:—

1. An electric toaster comprising a pair of vertically disposed, spaced heating elements, barred guards on each side of each element and means for supporting a slice of bread between the guards of said elements.

2. An electric toaster comprising a pair of vertically disposed, spaced heating elements, movable means for supporting slices of bread between said elements and immovable means for supporting slices of bread adjacent remote sides of the elements.

3. An electric toaster comprising a base, a pair of vertical frames arranged thereon in spaced relation, heating elements mounted in said frames, wires passing over said frames and having their ends secured to the base, forming a protective guard on each side of each element, and means for supporting slices of bread between the frames and on the remote sides thereof.

4. In a toaster a base, a vertically disposed heating element support thereon, a guard connected to said support, and means for holding bread against said guard comprising a horizontally disposed heavy bar, and supports for said bar hingedly connected to the top of the element support on the opposite side of the guard from said bar, whereby the bar is drawn by gravity against the guard.

5. In a toaster a base, a pair of element supports secured thereto in parallel, spaced relation, a bread carrier mounted between said element supports, and supports for said carrier clamped between the element supports and the base.

6. In a toaster a pair of heating elements arranged in spaced parallel planes, a bread carrier movably mounted between said elements comprising an inverted U-shaped body member and projections therefrom at intervals along the sides, such projections being spaced to receive between them a slice of bread, and adapted to hold the bread out of contact with the heating elements.

In witness whereof, I have hereunto set my hand.

EDWARD P. TAYLOR.